United States Patent [19]

Lavelle

[11] Patent Number: 4,945,673
[45] Date of Patent: Aug. 7, 1990

[54] CENTRALIZED EXTERMINATION SYSTEM

[76] Inventor: Kevin P. Lavelle, 5 Emerson Ct., Winchester, Mass. 01890

[21] Appl. No.: 416,384

[22] Filed: Oct. 3, 1989

[51] Int. Cl.⁵ .......................... A01M 7/00; A01M 1/20
[52] U.S. Cl. ...................................................... 43/124
[58] Field of Search ....................... 43/124, 131, 132.1, 43/125; 239/271; 52/101, 302, 220, 221, 787, 743

[56] References Cited

U.S. PATENT DOCUMENTS

| | | |
|---|---|---|
| 925,584 | 6/1909 | Levey . |
| 1,860,231 | 5/1932 | Carpenter . |
| 2,291,358 | 7/1942 | Treadwell et al. . |
| 3,624,953 | 12/1971 | Crosby ................................. 43/124 |
| 4,648,202 | 3/1987 | Renth ................................... 43/124 |
| 4,742,641 | 5/1988 | Cretti ................................... 43/124 |
| 4,800,672 | 1/1989 | Jackson . |
| 4,823,505 | 4/1989 | Jackson ................................ 43/124 |

Primary Examiner—M. Jordan
Attorney, Agent, or Firm—Lorusso & Loud

[57] ABSTRACT

A method and apparatus for pest control in which chambers are permanently placed at various positions in the walls of a building. Each chamber comprises a duct having an open proximal end and holes in its sides. The chambers may be placed in the walls either during building construction or in retrofit applications. Insecticide or rodenticide is sprayed or placed in the chamber using extermination methods known in the art. A cover plate prevents children and pests from accessing a chamber and any pest control substance within it. In a further embodiment, an adaptor nozzle is placed on a sprayer of fogger nozzle before insertion into the chamber. When rodenticide or insecticide is sprayed through the nozzle, the nozzle evenly disperses the rodenticide through the holes in the chamber to ensure the entire cavity of the interior wall is reached.

15 Claims, 4 Drawing Sheets

CENTRALIZED EXTERMINATION SYSTEM

BACKGROUND OF THE INVENTION

The present invention relates to an improvement in pest control, and more specifically, to a method and system for pest control achieved by providing permanent access to wall cavities and the like via chambers into which pest control chemicals may be sprayed or deposited.

In both residences and commercial buildings, pests such as rodents and insects can make habitation unpleasant and possibly unsanitary or unhealthy for humans. This problem is especially prevalent in urban areas where the availability of garbage and other wastes provides ready nourishment for rats, roaches, and other pests, allowing them to thrive. In addition, pest problems exist in suburban and rural areas where food for pests is available, allowing pests such as mice and ants to thrive. Due to the discomfort and health problems presented, building occupants desire to eliminate pests by applying insecticides or rodenticides to their buildings. In this connection, the phrase "insecticides and rodenticides" refers to any chemical substance used to poison and kill pests, including Dursban, Baygon, Diazanon and various fogging compounds.

Occupants use a number of methods to rid buildings of pests with insecticides or rodenticides. One popular method involves spraying insecticide in an area where pests are found. Such spraying is accomplished with aerosol containers, spray tanks or fogging machines. The aerosol method is commonly used by homeowners because aerosol containers of insecticide are available in local stores and are relatively inexpensive. The RAID brand marketed by the S.C. Johnson Co. of Racine, Wis. is one example of such readily available aerosol insecticides.

Professional exterminators often prefer spray tank application using a hand-pressurized container of insecticide with a hose and nozzle for directing the spray of the insecticide. The initial investment for spray tank systems is much greater than that for aerosol containers, but the greater expense is outweighed by the ability to re-use the tanks and the large amount of insecticide such tanks can hold. These qualities make the spray tank systems attractive to persons such as pest professionals who use insecticides on a regular basis to cover large areas.

The most effective way to apply chemicals by spraying is to spray in any cracks or openings in walls or floors. It is a fact that insects, such as cockroaches and ants, live and multiply in the walls of buildings. Spraying in cracks and crevices reaches the pests contained within the walls. For best results, spraying should be done into the walls at regular intervals to create a chemical residual barrier to kill pests. The treatment may be of limited success, however, if there are not enough crevices to allow access to all parts of the interior of the walls.

If no cracks or openings exist, access to the areas which are overrun by pests is limited. Application of chemical spray to exposed areas such as baseboards may then become necessary. An alternative method of spraying insecticide in an enclosed area is by means of a fogger. A fogger is a misting machine or pressurized canister for use in an enclosed area to release a pest control chemical into the entire enclosed area. Such devices have the advantage of filling the entire room with insecticide in a short period of time without requiring inch-by-inch application. Fogging is often used together with spraying in cracks and crevices in an enclosed area; the fogging draws the insects into the residual chemical barrier already applied to the area. It should be noted that spraying the baseboards and/or perimeters of the rooms or fogging an entire room only reaches a small part of the infestation problem. Insects and rodents simply return into their nests, normally between the interior and exterior walls deep in the structure of the building, where they are protected from such treatment and continue to live and multiply. Moreover, the sprayed areas will be contaminated by the chemical and provides a hazard to children and pets. Such treatment in a commercial kitchen presents additional problems because food preparation cannot begin again until the entire area is cleaned, which often cleans up the treatment chemicals as well and leaves the pests free to thrive.

Baiting with poisoned bait is a popular method of exterminating rodents. If access can be had to the interior of walls or under floors by means of cracks or spaces, the exterminator will place the bait there. Often the cracks or spaces are not large enough for the bait, which also may come in a container too large for the spaces. Accordingly, the exterminator must leave the poisoned bait container in the open room, creating a hazard for children and pets. In addition, leaving the baited container in an open room calls visitors' attention to the pest problem and could embarrass the building occupant.

Leaving a poison such as boric acid in an area inhabited by insects is another popular pest control method. Again, a lack of access to remote nesting areas and the potential health hazards make this method ineffective and undesirable in some cases.

As with all pest control systems, the goal of these systems is to reach as many of the pests as possible. One major disadvantage with each of the above noted systems is that the pest control substance does not always reach the pests to be exterminated since the pests nest remotely from the room interior. With the fogger, the pesticide fog reaches only the open room and a small distance into the cracks and holes in the wall and floor. Generally, only about 10% of the fog reaches the interior of the wall. With a spray system, the spray from the sprayer is sprayed directly into holes and cracks or along the wall and floor, but still does not reach the pests' most remote nesting areas. The baited poison likewise is not near the nesting areas. Therefore the pests are less likely to reach the pest control compounds and they are less likely to be effective. The container of poison is similarly distant from the nesting areas. With each of these known methods of pest extermination, the poisonous pest control substance is exposed to some extent to the room and is therefore potentially hazardous to room occupants.

With spraying, fogging, baiting and direct poisoning, the exterminator's goal is to place insecticide or rodenticide as near as possible to the areas where pests inhabit and nest. These nesting areas are generally hidden from view away from direct access, within walls and under floors, and the only access to these nesting areas is through existing cracks, holes, and spaces. Due to the uneven placement of these cracks and holes, creating a chemical barrier and residual to kill all the existing pests may be impossible. The pests may nest a great distance from the means of access of the chemicals and be outside the radius of the barrier created. Therefore the insecticide or rodenticide may not reach the area desired and the application of it may be ineffective.

A solution to the access problem is shown in U.S. Pat. No 4,800,672. The Jackson patent discloses a centralized fumigation system for exterminating insects in a building. The fumigation system includes a distribution means installed in the building for transferring insecticide from a common reservoir into the interior walls of the building. Jackson's distribution system includes a plurality of tubular means installed in the spaces between walls, in which each of the tubular means has a nozzle at the end for spraying insecticide into the space between walls. This system must be installed as part of the initial construction of the building or will require major reconstruction for retrofit installation. Therefore it is expensive and impractical for most pest control applications. Additionally, the system cannot be utilized with poisoned bait or power pest control methods since it requires a flow of pest control substance through its tubular means.

Accordingly, it is an object of the present invention to provide a method of pest control which provides access to all possible pest nesting areas in the walls of a building.

A further object of the present invention is to provide a method of pest control that is safe for use in areas inhabited by humans, especially children, and pets and keep the pest control substances unexposed and safely contained to interior walls.

Still another object of the present invention is to provide a method of pest control that does not interfere with the use of the premises to be treated.

Yet another object of the present invention is to provide a method of pest control that is not visible or malodorous.

A further object of the present invention is to provide a method of pest control that can be used with aerosol, liquid, or solid poisons.

A still further object of the present invention is to provide a system for pest control that is inexpensive and can easily be retrofit to existing buildings.

SUMMARY OF THE INVENTION

These and other objects of the present invention are met by providing a method and system of pest control in which chambers are permanently placed at suitable positions in the walls of a building to allow for effective pest control treatment in a continual manner. The chambers may be placed in the walls either during building construction or in retrofit applications. The chamber is a container, which may be of any shape, having holes around its circumference and/or is open ended, a lip to allow attachment to the interior wall of a room, and a cover. This system is especially suitable for commercial applications, especially in a commercial kitchen where pest control treatment is normally required on a weekly basis.

Insecticide is sprayed or rodenticide is placed into a chamber using extermination methods known in the art. If sprayed into the chamber, the pest control substance passes through the holes in the chamber and fills the interior portion of the wall to reach and exterminate any pests located within the interior of the wall. If solid chemicals are placed in the chamber, the pests then access the pest control substance through the holes in the chamber, consume the pest control substance, and die.

A cover plate prevents children and pests from accessing the chamber and any pest control substance within it. The cover may be hinged and have either a lock or a spring to keep it closed until access is required. In a preferred embodiment, the chamber has a lip with an adhesive to secure the chamber to a prepared hole in the wall. In a further embodiment, an adaptor nozzle is provided to be placed on a sprayer or fogger nozzle before insertion into the chamber, which will be provided with a corresponding receptor part. When insecticide is sprayed through the nozzle, the nozzle evenly disperses the insecticide through the holes in the chamber to ensure that the entire interior of the wall is reached and an effective chemical barrier is produced.

The present invention is further described in the following description of the preferred embodiments taken together with the drawing, in which like reference numbers refer to like members in the various figures.

DESCRIPTION OF THE PREFERRED EMBODIMENTS

At the outset the invention is described in its broadest overall aspects with a more detailed description following.

In the method of the present invention, chambers are permanently placed at various positions in the walls of a building in areas where pest control treatment is required. The chambers are normally installed, depending upon the particular application, in 2-3 foot intervals along the walls surrounding the room for insects and every 10-15 feet for rodents. For rodents, the chambers are placed along the floor, or approximately 5 inches above the floor, while for insect treatment, they are installed 2-3 feet above the floor.

Figure 1:
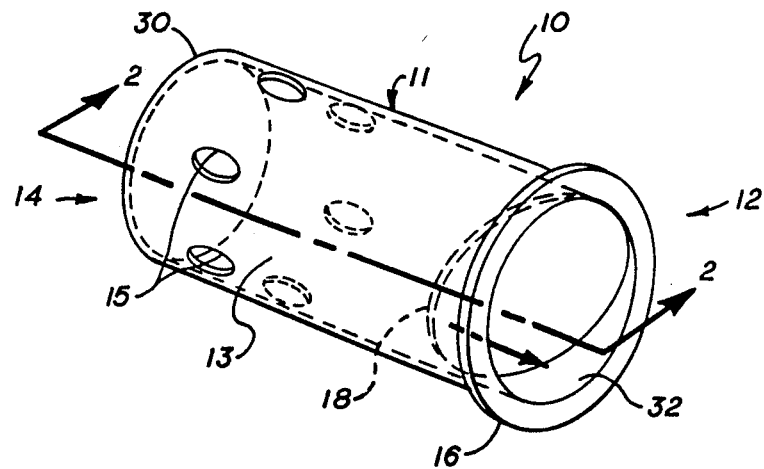
FIG. 1 is a perspective view of one embodiment of the chamber for use with the pest control system of the present invention.

One embodiment of the chamber of the present invention, a round configuration, is shown in FIG. 1. The round chamber 10 includes a tubular duct 11 having a proximal open end 12, a distal end 14 which rests in the wall interior, and a wall 13 including holes 15. The size of the holes 15 will vary and may be dictated by whether the pests are to be exterminated by solid or liquid/gas pest control substances. If solid is chosen, the holes 15 may be larger than if liquid or gas is chosen because the pests to be exterminated will need access to the chamber 10 in order to consume the pest control substance. Alternatively, larger holes 15 may be chosen so that a pest control substance of any state may effectively be used. A lip 16 may be provided at the proximal end 12 to prevent insertion of the chamber 10 too far into a wall and to provide a means by which the chamber 10 may be fastened to the wall. The distal end 14 may be closed or it may be open to provide another means by which the pest control substance filters into the cavity of the wall or by which pests access the substance in the chamber 10.

A cover plate 18 may also be provided at the proximal end 12 to prevent children and pests from accessing any pest control substance within the chamber 10. The cover plate 18 may be attached to the duct 11 in a conventional manner, for example, the cover plate 18 may be hinged and have either a lock or a spring to keep it closed until access to the chamber 10 is required by flipping the cover plate 18 or sliding it away from the hole. Alternatively, the cover plate 18 could be in the form of a removable plug held in place by press fitting or threading to the proximal open end 12 of the chamber 10. Additionally, the cover plate 18 may be colored to match the interior design of the room and therefore will be unobtrusive to those in the room. In a preferred embodiment, the cover plate 18 could be designed to resemble an electrical outlet to disguise its true function.

Figure 3:
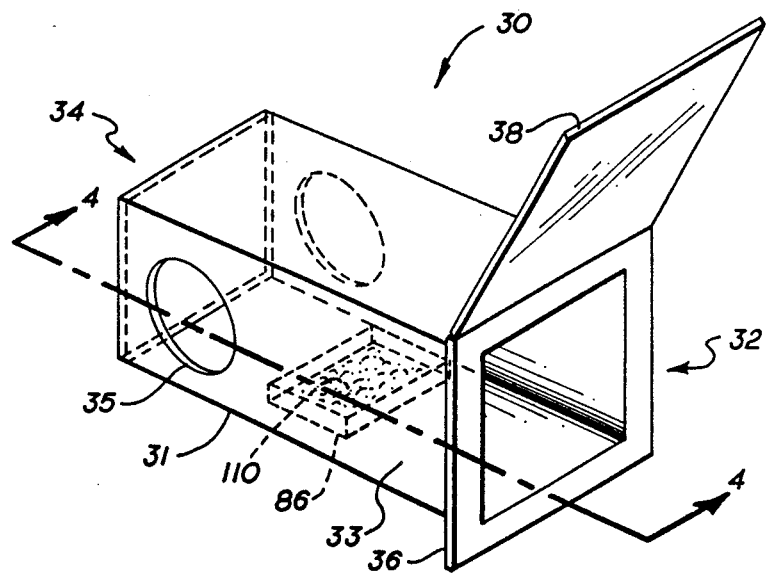
FIG. 3 is a perspective view of another embodiment of the chamber for use with the pest control system of the present invention.
Figure 4:
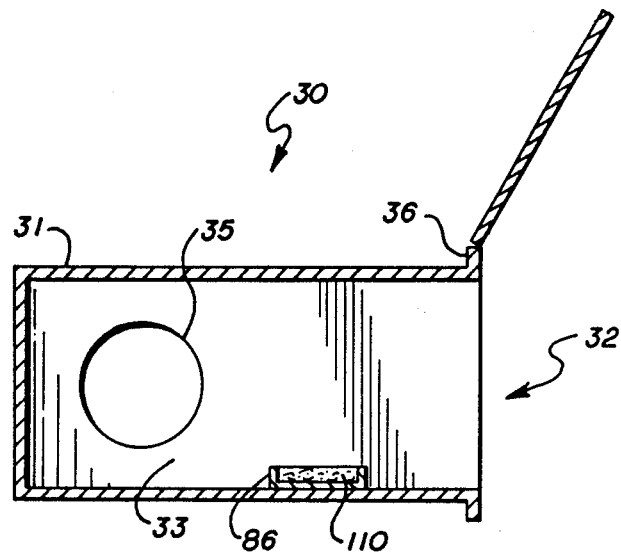
FIG. 4 is a longitudinal cross-sectional view taken along line 4—4 of the chamber of FIG. 3.

Additional configurations of the chamber, such as the rectangular configuration shown in FIGS. 3 and 4, may be chosen for use with the pest control method of the present invention. As shown in those figures, a duct 31 of rectangular cross-section is used, having a proximal end 32, a distal end 34 and walls 33 with through holes 35. A lip 36 may be provided at the proximal end 32 to ensure flush mounting of the chamber 30 in the wall of the room.

The chambers 10, 30 may be of any configuration and should be formed of a material that will maintain its integrity despite repeated applications of the chemicals used for extermination purposes. A suitable material is aluminum or plastic. Other materials and appropriate shapes of the chambers will be readily apparent to those skilled in the art.

Figure 5:
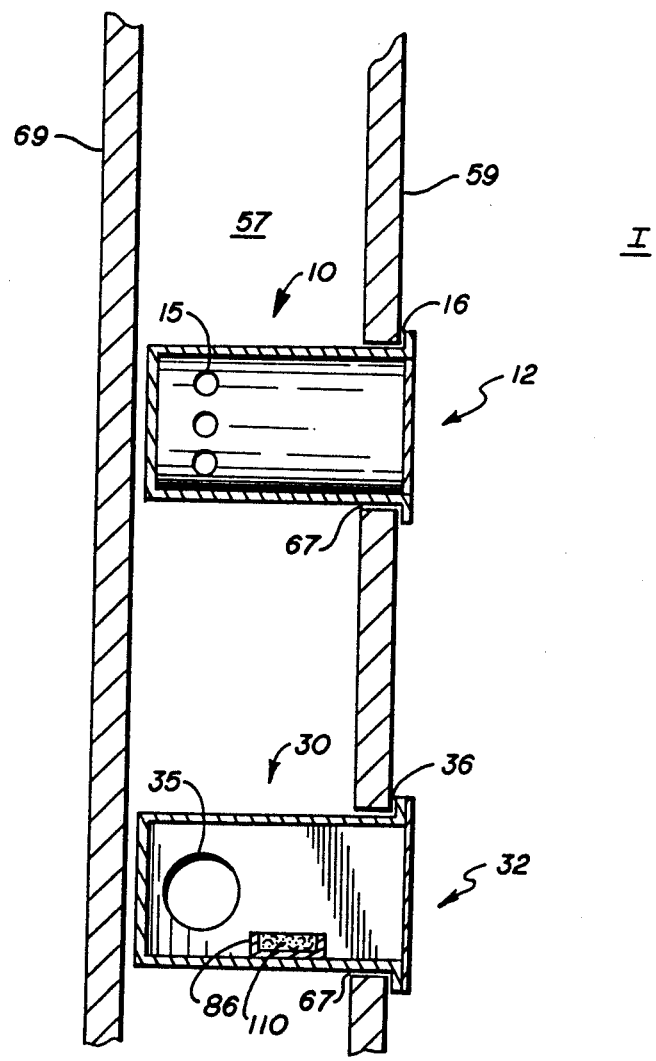
FIG. 5 is a schematic diagram showing possible placement of the chambers of the present invention in use with the method of the present invention.

FIG. 5 illustrates possible placements of the chambers into a wall for use. The chambers 10, 30 may be installed in the space between the interior walls 59 and exterior walls 69 of a building either during building construction or in retrofit applications. Of course, most situations will only require treatment for either insects or rodents, not both, and accordingly the chamber placement will be so dictated. Although this figure shows chambers placed for both treatments, it is for the purpose of illustration only. To install, holes 67 of approximately the same size and shape as the exterior of the chamber 10, 30 are prepared in the interior wall 59. The installer should place the holes 67 (and thus the chambers 10, 30) at regular intervals so that the chemical barrier formed during use will be complete. Each chamber 10, 30 should then be placed into a hole 67 with its proximal end 12, 32 facing the interior of the room "I". The lip 16, 36 preferably has adhesive on its side facing the interior wall 59 during application. When the casing 10, 30 is set into the prepared hole 67 in the interior wall 59, the lip 16, 36 prevents the chamber 10, 30 from being set too far into the wall 59 and secures the chamber 10, 30 by the adhesive to the surface of the wall 59. Other means of securing the chamber 10, 30 to the wall 59 will be obvious to one with ordinary skill in the art.

In use, the cover plate 18, 38 is opened, and insecticide or rodenticide is sprayed or placed into a chamber 10, 30 using extermination methods known in the art. If sprayed, the nozzle of a spray tank or aerosol container is directed into the open end 12, 32 of the chamber 10, 30. The pest control spray passes into the chamber 10, 30 and through the holes 15, 35 in the chamber and if it is open ended, the distal end 14, 34 as well. It then disseminates throughout the interior portion 57 between the walls 59, 69 to reach and exterminate any pests located within the interior region 57 of the walls 59, 69.

Figure 6A:
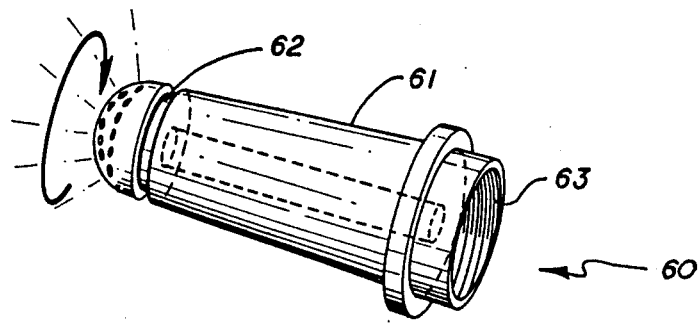
FIGS. 6a–6c are perspective views of adaptor nozzles for use with the pest control system of the present invention.
Figure 6B:
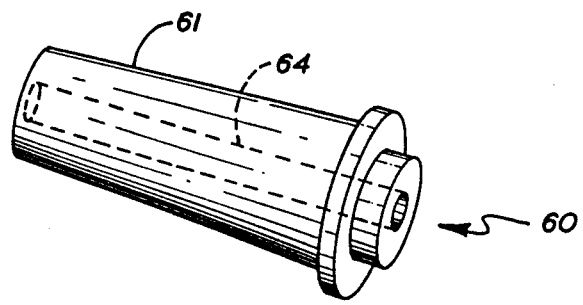
Figure 6C:
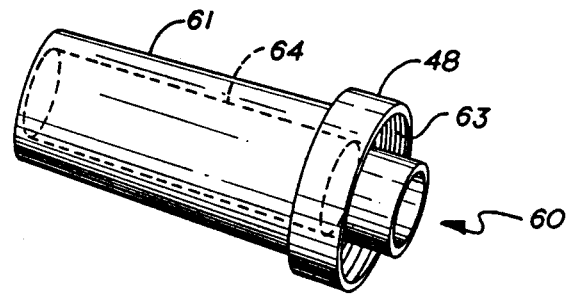

In a preferred embodiment, an adaptor nozzle head is used with the method and system of the present invention. The adaptor nozzle head will vary depending upon the apparatus used to spray pest control chemicals into the chamber. Suitable nozzle heads 60 are shown in FIGS. 6a-6c. An adaptor nozzle head 60 as shown in FIGS. 6a-6c is placed on a sprayer or fogger nozzle (not shown) before the insecticide or rodenticide is sprayed or fogged into the chamber. In using an adaptor nozzle head 60, only one size chamber will be required for a variety of pest control spray application methods. A suitable corresponding adaptor nozzle head receptor may be placed in the chamber to receive the adaptor nozzle head.

FIG. 6a is especially suitable for use with a spray tank, conventional in the art, and commonly used by pest control professionals. This adaptor head 60 includes a tubular extension 61 having a freely spinning fan spray 62 at its distal end. At the proximal end of the tubular extension, a threaded fitting 63 is provided to sealingly mate with the hose of the spray tank (not shown). When a pressurized substance is thrust through the spray tank hose and then through the adaptor nozzle 60, the fan spray 62 spins under pressure and the substance is distributed evenly in a 360° arc mist throughout the chamber of the present invention and into the wall interior. This provides a superior spray to known adaptor nozzles, which spray from the face of the nozzle in an arc of a smaller degree, as opposed to the 360° spray achieved with the present nozzle.

The adaptor nozzle head 60 shown in FIG. 6b is useful with an aerosol spray can. For the aerosol adaptor nozzle 60 shown in FIG. 6b, the tubular extension 61 incorporates through its interior a tube 64 to mate with the aerosol container nozzle (not shown). When insecticide is sprayed through the aerosol adaptor nozzle 60, the nozzle 60 evenly disperses the pest control substance through the holes in the chamber to ensure that the entire interior of the wall is reached. This embodiment may also include an aerosol fan spray member, similar to that shown in FIG. 6a, at the distal end of the adaptor nozzle head 60 for better dispersion of the pest control chemicals.

Finally, the adaptor nozzle head shown in FIG. 6c is especially suitable for use with a MICRO-GEN FOGGER machine, available from MICRO-GEN Equipment Corporation of San Antonio, Tex. For the fogger adaptor nozzle 60 of FIG. 6c, the nozzle, also having a tubular extension 61 and a threaded fitting 63 at its proximal end, includes a stopper 48 positioned slightly behind the proximal end. The adaptor nozzle 60 is inserted onto the fogger nozzle (not shown) until the stopper 48 stops the adaptor nozzle 60 and seals it to the fogger nozzle. In use, the fogger is activated and the fog travels into the adaptor nozzle 60 and down the tubular extension 61 through the interior tube 64 until it disperses to fill the wall interior with pest control fog. Other embodiments of adaptor nozzles will be obvious to those skilled in the art.

As shown in FIG. 5, if rodenticide or insecticide of solid form is used, the substance is placed in the chamber 10, 30. FIG. 5 shows the solid substance 110 may be placed on a feeding dish 86 or may be placed on the bottom interior surface of the chamber 10, 30. The pests become attracted to the bait contained in the substance 110 and proceed toward the chamber 10, 30. The pests then enter the chamber 10, 30 through the holes 15, 35 and consume the pest control substance 110. After consumption, the pests die due to poisoning. When the insecticide or rodenticide is consumed or when a fresh batch is needed, any waste is removed from the chamber 10, 30 and new rodenticide or insecticide is added by entry through the cover plate 18, 38 from the interior of the room. This procedure may periodically be repeated to ensure that the pest control problem does not recur, with the chambers 10, 30 allowing permanent access to the wall interior as necessary.

EXAMPLE 1

Figure 2:
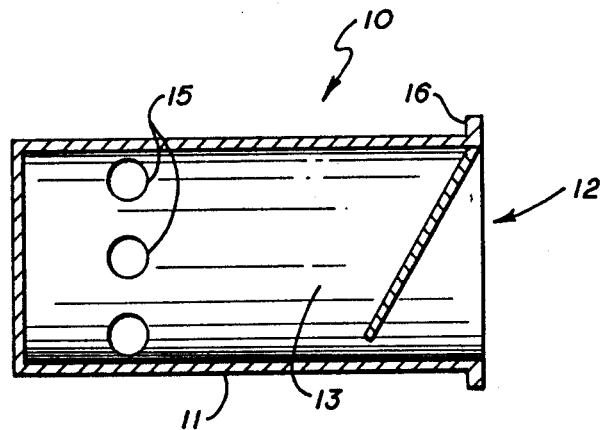
FIG. 2 is a longitudinal cross-sectional view taken along line 2—2 of the chamber of FIG. 1.

A chamber for use with the pest control method of the present invention using the round cross-sectional design shown in FIGS. 1 and 2 provides the first example. The chamber is made of aluminum sheet metal approximately 0.050 inches thick and is ½ inch in diameter and 2.5 inches long. A lip extends radially from the open end approximately ¼ inch. Five ¼ inch holes are provided on the circumference of the chamber about 1.5 inches from the open end, each spaced apart approximately ¼ inches on center. Insecticide is sprayed into the open end of the chamber and spreads through the wall space via the open holes to kill the insects living within the wall.

EXAMPLE 2

A chamber for use with the pest control method of the present invention using the rectangular cross-sectional design shown in FIGS. 3 and 4 provides the second example. The chamber is made of aluminum sheet metal approximately 0.050 inches thick and is 2 inches square by 3.5 inches long. A lip extends from the open end approximately ¼ inch on each of the four sides. One ¼ to 1 inch hole is provided on each of the vertical sides of the chamber about 1.75 inches from the open end. Baited rodenticide is placed on a tray which is placed on the bottom surface inside the chamber. Rodents are attracted to the bait and enter the chamber through the ¼ to 1 inch holes, consume the rodenticide, and later die.

The embodiments of the present invention of a method of pest control described above are set out by way of illustration but not of limitation. Many other embodiments which will be readily apparent to those skilled in the art may be made without materially departing from the spirit and scope of this invention.

What is claimed is:

1. A method for exterminating pests in the interior of a building and within the walls of a building, comprising:
   providing a plurality of orifices in the building walls, each of said orifices providing access to a cavity within the building walls;
   installing a chamber through each of said orifices, said chamber comprising a duct having an open end and sides, said open end opening to the orifice from the interior of the building, said chamber further comprising a plurality of holes within said sides to provide access to the cavity within the walls; and
   supplying a pest extermination substance into each of said chambers through said open end.

2. The method according to claim 1, wherein each of said chambers further comprises a lip about said open end for fitting flush against an interior wall of the building when the chamber is installed.

3. The method according to claim 2 further comprising the step of applying adhesive to the side of the lip that faces the interior wall before the step of installing said chamber, so that said chamber will adhere to the building wall.

4. The method according to claim 1 further comprising the step of providing a cover plate for the chamber, wherein said cover plate is removably placed over said open end and wherein said cover plate is removed from said open end prior to the step of supplying a pest extermination substance, and wherein said cover plate is replaced over said open end after the step of supplying a pest extermination substance.

5. The method according to claim 1 wherein said chamber has a round cross-section.

6. The method according to claim 1 wherein said chamber has a rectangular cross-section.

7. The method according to claim 1 wherein said plurality of orifices are provided on a building wall adjacent a floor.

8. The method according to claim 1 wherein said plurality of orifices are provided on a building wall from 5 to 36 inches above the floor.

9. The method according to claim 1 further comprising the step of supplying a removable adaptor nozzle on a pest extermination substance spraying device before the step of supplying a pest extermination substance through said chamber.

10. The method according to claim 1 wherein said pest extermination substance comprises rodenticide.

11. The method according to claim 1 wherein said extermination substance comprises insecticide.

12. The method according to claim 1 wherein said chamber is comprised of aluminum.

13. The method of claim 1 wherein said pest extermination substance is supplied by causing it to flow through said chamber and exit said chamber through said plurality of holes to exterminate pests in the cavity.

14. The method of claim 1 wherein said pest extermination substance is supplied in said chamber in solid form, so that pests may access said extermination substance through said plurality of holes.

15. A chamber for use in exterminating pests in the interior of a building and within the cavity between the walls of a building, comprising:
   a duct having an proximal end and a distal end, said duct having a plurality of holes in its sides to provide access the cavity within the building walls, a lip surrounding the proximal end capable of adhering to an interior wall of the building to provide a means by which the chamber may be secured to the interior wall, and a removable cover plate on the proximal end.

* * * * *